Oct. 17, 1967    R. B. KERR    3,348,193
SYSTEM FOR THE ELECTRONIC SPLICING OF SIGNALS
Filed May 27, 1965

Oct. 17, 1967  R. B. KERR  3,348,193
SYSTEM FOR THE ELECTRONIC SPLICING OF SIGNALS
Filed May 27, 1965  2 Sheets-Sheet 2

United States Patent Office 3,348,193
Patented Oct. 17, 1967

3,348,193
SYSTEM FOR THE ELECTRONIC SPLICING
OF SIGNALS
Robert B. Kerr, Dallas, Tex., assignor to Mobil Oil
Corporation, a corporation of New York
Filed May 27, 1965, Ser. No. 459,169
7 Claims. (Cl. 340—15.5)

ABSTRACT OF THE DISCLOSURE

The specification discloses a system for electronically splicing the early portion of a first seismic signal containing good shallow reflections onto the later portion of a second seismic signal produced by CDP compositing to obtain a composite signal without introducing a switching transient or step-amplitude change. The first and second signals are applied to a gate circuit including two photoresistors, each photoresistor being exposed to its own lamp. Splicing is accomplished by turning one lamp on and concurrently turning the other lamp off.

---

This invention relates to a system for combining, with respect to time in response to a control function, different proportions of a plurality of input signals to produce an output signal without introducing a switching transient in the output signal. More particularly, it may be used advantageously for electronically splicing a plurality of input signals without introducing a switching transient. Since the invention is particularly suitable for a system for splicing seismic signals, it will be explained with reference to such systems.

In the art of seismic prospecting, seismic energy is imparted to the earth by either an explosion of dynamite or the impact of a weight at one location to create downward-going waves. These downward-going waves are partially reflected upward at interfaces in the layers of the earth where there is an acoustic impedance contrast. The reflected waves are detected at groups of geophones located at the surface of the earth and arranged in a spread. The detected signal received at each group of geophones or detector stations is converted into a representative electrical signal and recorded on some reproducible medium, such as magnetic tape. The signals from each detector station are recorded as side-by-side traces on the magnetic tape. A time-break pulse is also recorded as one of the traces to indicate the zero time reference at the instant of generating the seismic energy at the earth.

In the recently developed method of common depth point seismic exploration, there are produced several signals containing reflections from the same subsurface reflecting point but recorded with different source-to-detector spacings. After correcting each trace for differences in source-to-detector spacings, the common depth point (CDP) traces are composited on the theory that the primary reflections will add in phase while the random noise, including multiple reflections, will add out of phase and cancel. Long offset distances between source and detector stations are required to obtain cancellation of the multiple reflections on the composited signal. As a result of using these long offset distances, the early portion of the recorded traces contains primarily refractions from shallow subsurface horizons and few reflections. However, the CDP traces, after being composited, contain strong reflections on the later portion of the trace and are multiple and noise free.

Often, seismologists have found it desirable to record a group of traces containing reflections from the same subsurface area of the earth as the long offset CDP traces, but with a short, actual source-to-detector spacing. The arrangement with a short source-to-detector spacing allows the recovery of shallow reflection information and strong reflections on the early portions of recorded traces. However, with these short source-to-detector spacings, the record traces of the later-arriving reflections are masked by multiples and noise.

To aid in the interpretation of the seismic signals, it is desirable to combine the early portion of the short offset distance trace with the later portion of the long offset distance trace to obtain a single combination trace with the best reflection information from both traces. However, when the two traces are spliced during recording of the combination trace by mechanical switching means or relays, there is introduced a switching transient in the combination trace. Furthermore, if the amplitudes of the two traces are not at the same level at the instant of switching, there is an obviously visible step-amplitude change introduced into the combination trace at the instant of switching.

Therefore, it is the primary object of the present invention to eliminate the switching transient and step-amplitude change in the combination trace.

In accordance with the present invention, in the method of reflection seismic surveying wherein a first group of seismic signals is produced from an area of the earth with arrangements causing noise-free reflections on the early portion of the signals and noisy reflections on the later portion of the signals and wherein a second group of seismic signals is produced from the same area of the earth with arrangements causing noisy reflections on the early portion of the signals and noise-free reflections on the later portion of the signals, there is provided the following method for electronically splicing the signals of the first and second groups to form a third group of signals containing the best reflections from both groups. Initially, the first group of signals and the second group of signals are reproduced with a common time reference. The amplitude of the first group of signals is adjusted to a level desirable for recording. The amplitude of the second group of signals is adjusted to a level substantially below the level desirable for recording. Then, individual signals of the first group and the corresponding individual signals of the second group are simultaneously added to form the third group of signals, and the third group of signals is recorded. At a predetermined time during the recording of the third group of signals, the amplitude of the first group is reduced continuously over a finite period of time to a level substantially below the level desirable for recording while the amplitude of the second group of signals is simultaneously increased continuously over the same period of time to the level desirable for recording.

In a further aspect of the invention, there is provided a circuit arrangement having a plurality of input circuits for connection to a plurality of input signals and a single output circuit for alternately connecting one of the input signals to a utilization device. At least one of a plurality of photosensitive elements is connected in circuit between each of the input circuits and the output circuit. The photosensitive elements vary the effective impedance path between each of the input circuits and the output circuit. One means impinges radiation on the photosensitive elements. Another means controls the intensity of radiation impinging on the photosensitive elements so that the effective impedance of a first input circuit is substantially less than the effective impedance of the other of the input circuits. Still another means varies the intensity of radiation impinging on the photosensitive elements in a second input circuit so that the effective impedance in the second input circuit increases continuously over a finite period of time. The same means simultaneously varies the intensity of radiation impinging on the photosensitive elements in the first input circuit so that the effective impedance in the first input circuit decreases continuously over the same period of time.

In a more specific aspect, the means for impinging radiation is a light source and the photosensitive elements are photoresistors.

For other objects and advantages and for a better understanding of the present invention, refer now to the following detailed description and accompanying drawings in which.

First there will be described the method of my invention with reference to FIGURES 1 and 3. Then there will be described a system for carrying out the method of my invention.

Figure 1:
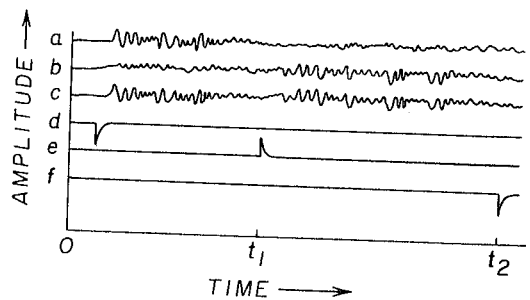
FIGURE 1 illustrates waveforms at selected points in the system of FIGURE 2.

In FIGURE 1, there is illustrated a seismic trace $a$ which is trace No. 1 from a first group of seismic traces taken from a field magnetic tape. Trace $a$ has noise-free reflections at early times on the trace indicative of shallow horizons, but has noisy reflections later in time on the trace indicative of deep horizons. Another seismic trace $b$ is illustrated from a second group of seismic signals taken from another field magnetic tape. Trace $b$ has noisy reflections on the early portion of the trace, but has noise-free reflections on the later portion of the trace. As mentioned previously, trace $a$ may be of the type produced with a field arrangement having a relatively short source-to-detector spacing. Trace $b$ may be a composited CDP trace of the type produced with a field arrangement having a relatively long source-to-detector spacing.

According to the method of the present invention, trace $a$ is adjusted to the proper amplitude level desirable for recording. Trace $b$ is initially adjusted to an amplitude level substantially below the amplitude level desirable for recording. The amplitude levels of traces $a$ and $b$ may be better seen by reference also to FIGURE 3. Therein, the curve 10 represents the amplitude level of each trace in the first group of traces, as for example, trace $a$. Curve 12 represents the amplitude level of each signal in the second group of traces, as for example, trace $b$. The amplitude level of the signals in the second group of traces may be zero or may be so near zero that it is small compared to the amplitude level of the first group of traces, as indicated by curve 10. With the amplitude levels of the individual traces in the first and second groups adjusted to these levels, the corresponding individual traces of each group are added together to form a third composite group of traces. The adding of trace $a$ and trace $b$ produces trace $c$ in the third composite group. Where the amplitude of the second group of traces is below about 10 percent of the amplitude of the first group of traces, the third group of traces will visibly contain only the component due to the first group of traces.

Now at some time $t_1$, which a seismologist has previously determined as the best time for splicing the signals of the first group and the second group, the amplitude level of the first group, as indicated by curve 10, is reduced continuously over a finite period of time T to a level substantially below the level desirable for recording. Simultaneously, the amplitude level of the second group of traces, as indicated by curve 12, is increased over the same period of time T to the level desirable for recording. Now, the third composite group of traces contains primarily the signals in the second group of traces. Trace $c$ in the third composite group of traces now contains the best reflection information from both traces $a$ and $b$.

The switching time T may suitably be between 100 milliseconds and 300 milliseconds. Where the switching time is less than about 100 milliseconds, there may be switching transients or step-amplitude changes visually noticeable on the third composite trace. Where the switching time is longer than about 300 milliseconds, the third composite trace contains a visually noticeable portion of both of the signals in the first and second groups of signals.

When the term "corresponding individual traces" is used, it is meant those traces including reflections from the same approximate subsurface interfaces. Thus, for example, where there are twenty-four traces in a first group of traces recorded from a field arrangement where there are twenty-four side-by-side detector stations arranged in a linear spread, the detector stations may be numbered from 1 to 24, consecutively, with numbers increasing as the distance away from the seismic source increases. The side-by-side traces on the first group of traces may be numbered similarly from 1 to 24, increasing consecutively as the distance from the seismic source increases. When a second group of traces is produced including reflections from the same area of earth as the traces of the first group, the traces may be numbered consecutively from 1 to 24, increasing in number as the distances away from the seismic source increases. Then, in the method of my invention, trace No. 1, first group, is spliced with trace No. 1, second group. Trace No. 2, first group, is spliced with trace No. 2, second group, and so on.

Now there will be described with reference to FIGURE 2 one embodiment of a system for carrying out the method of my invention. The waveforms of FIGURE 1 are representative of the signals appearing at the indicated points in FIGURE 2. To simplify the drawing and lend clarity to the description, only one circuit for splicing a single channel is illustrated; but it will be readily apparent that the remaining channels are merely duplicates of the channel illustrated, and that in actual practice all twenty-four traces of the first and second groups of traces are spliced simultaneously.

Figure 2:
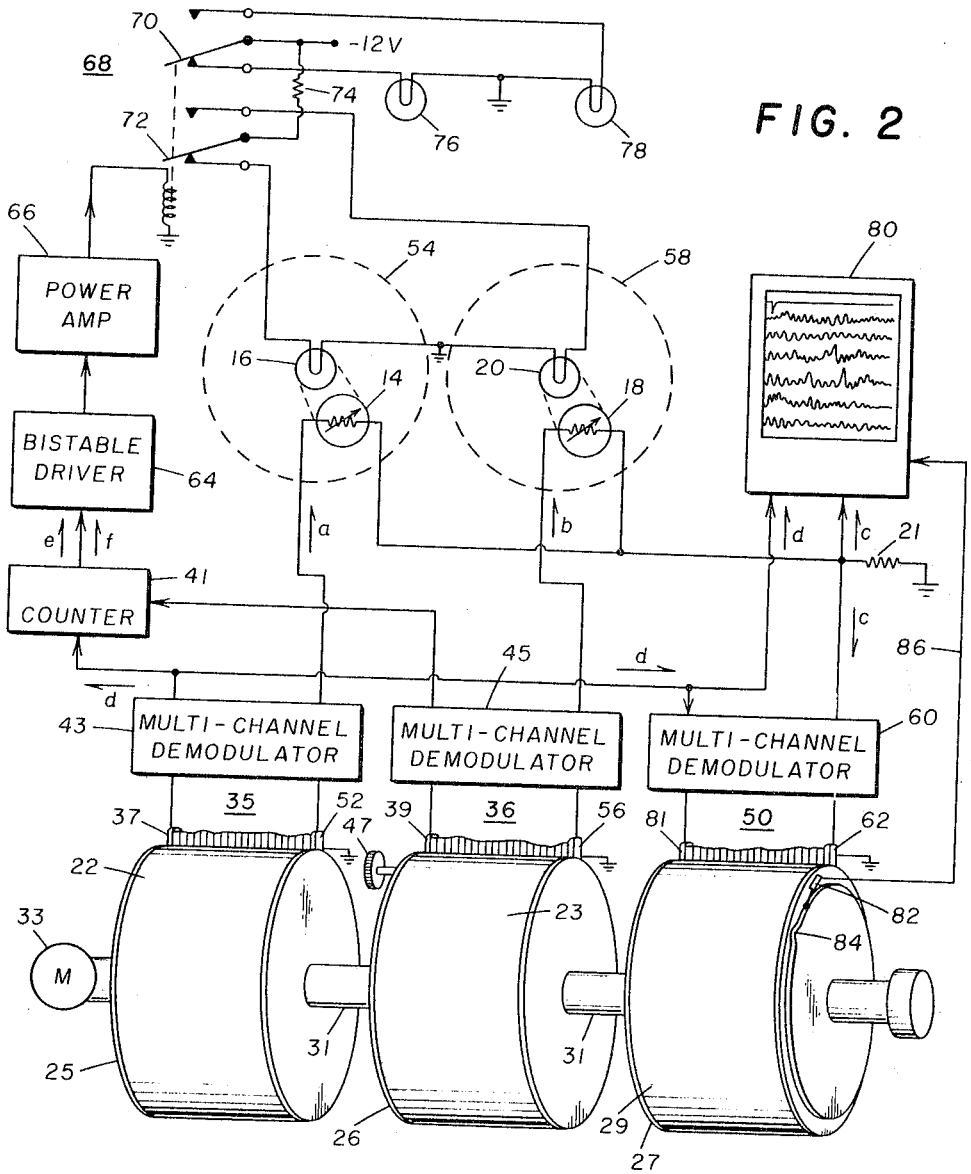
FIGURE 2 illustrates one system for carrying out the present invention.

Briefly, the operation of the system of FIGURE 2 is as follows. The reproduced trace $a$ is applied to a first input circuit of a voltage divider arrangement, including a photoresistor 14 exposed to a lamp 16. Trace $b$, reproduced with the same time reference as trace $a$, is applied to a second input circuit of the voltage divider arrangement, including a photoresistor 18 exposed to a lamp 20. The output circuit of the voltage divider arrangement includes a summing resistor 21. When the resistance of photoresistor 14 is low compared to the value of the resistance of photoresistor 18, the signal appearing across summing resistor 21 is substantially trace $a$. Photoresistor 14 has a low value of resistance when it is illuminated by lamp 16. However, when photoresistor 18 is illuminated by lamp 20 and photoresistor 14 is not illuminated by lamp 16, the resistance of photoresistor 18 is low compared to that of the resistance of photoresistor 14, and the signal appearing across summing resistor 21 is primarily trace $b$. By taking advantage of the finite time for the filament of lamp 16 to go from a hot state to a cold state after the input voltage is removed, the resistance of photoresistor 14 is made to vary slowly. If the input voltage is simultaneously switched to the filament of lamp 20, there is a finite time for the filament of lamp 20 to go from a cold state to a hot state. Therefore, the resistance of photoresistor 18 decreases slowly. By means of the slowly varying resistance of photoresistors 14 and 18, trace $a$ may be blended out of connection with the resistor 21 and trace $b$ may be blended into connection.

In more detail now, magnetic tapes 22 and 23, containing the first and second groups of traces respectively recorded in the frequency-modulated (FM) mode, are placed on playback drums 25 and 26. A recording drum 27 has located thereon a blank magnetic tape 29 for recording of the third composite group of signals. The drums 25–27 are mounted on a common shaft 31 and are driven in synchronism by constant-speed motor 33. The speed of motor 33 is such that the magnetic tapes 22 and 23 revolve at the same speed as that at which the traces on the tapes were originally recorded in the field.

The side-by-side traces on tape 22 recorded magnetically in the FM mode are each sensed by one of a group of playback heads 35 and converted into an FM electrical signal. Similarly, the side-by-side traces on tape 23 are each sensed by one of playback heads 36 and converted into a representative FM electrical signal.

Before the traces on tape 22 may be spliced with the corresponding individual traces on tape 23, the traces on each tape must first be aligned with a common time reference. The time break on tape 22 may be taken as the common time reference. The time break on tape 22 is sensed by head 37, and the time break on tape 23 is sensed by playback head 39. To detect the time difference between the two time breaks on each tape, a counter 41 is provided. The reference time break $d$ from playback head 27 is demodulated in multichannel demodulator 43 and applied to counter 41 to initiate timing operations. The time-break channel sensed by playback head 39 is demodulated in multichannel demodulator 45 and also applied to the counter 41. As soon as the time break from playback head 39 is received at the counter 41, the timing operations are stopped and a visual indication is given to an operator of the time delay between the two time breaks. Not only is a visual indication given, but also the sense of the time delay, that is, whether the time break from head 39 leads or lags the reference time break $d$ from head 37. According to the indication of the counter 41, an operator may rotate adjusting wheel 47 to rotate the playback drum 26 relative to the shaft 31. By use of the adjusting wheel 47, the operator may align the time breaks from tapes 22 and 23 to within a time of about 1 millisecond. A more detailed description of the aligning of time breaks is given in my patent application Ser. No. 860,119, filed Dec. 17, 1959, now Patent No. 3,206,720, issued Sept. 14, 1965.

The signal outputs from each of the playback heads 35 and 36 are each connected through a voltage divider arrangement, including a photoresistive element, to the signal input of the recording heads 50. More particularly, the signal output trace $a$ sensed by playback head 52 is coupled by way of multichannel demodulator 43 to the photoresistor 14 contained in a light-tight housing 54. Although not shown, it will be understood that each and every other of the recording heads 35 is similarly connected to its own photoresistive element located in the light-tight housing 54. Similarly, the signal output trace $b$ sensed by playback head 56 is coupled by way of multichannel demodulator 45 to the photoresistor 18 located in light-tight housing 58. The sum of the signals sensed by playback heads 52 and 56 is developed across resistor 21 of the voltage dividing circuit. The sum of signals $a$ and $b$ developed across the resistor 21 is connected by way of one channel of multichannel modulator 60 to the recording head 62 for the recording of the composite signal $c$. The time break $d$ from tape 22 is recorded on tape 29 by recording head 81 to provide a time reference for the composite signals.

The photoresistors 14 and 18 are elements of the type whose resistances decrease in proportion to the amount of light incident thereon. Therefore, when photoresistor 14 is not illuminated by lamp 16, the resistance of photoresistor 14 is high, on the order of 1 or 2 megohms. If at the same time the lamp 20 inside light-tight housing 58 is energized so that photoresistor 18 is not illuminated, the resistance of photoresistor 18 is low, on the order of 500 ohms. Hence, the total signal appearing across the resistor 21 is primarily the signal output trace $a$ of playback head 52. However, when photoresistor 18 is illuminated by lamp 20 and photoresistor 14 is not illuminated, the signal appearing across the resistor 21 is substantially the output of playback head 56 or trace $b$. When a photoresistor in one input circuit is not illuminated, there is such a high impedance path between that input circuit and the output circuit that very little of the input signal applied to that circuit appears at the output circuit.

The automatic splicing of the signals in the first group of traces on tape 22 and the second group of traces on tape 23 is provided by the generation of a control function by counter 41. As explained above, a seismologist may determine in advance the best time for splicing the signals of the first and second groups. The counter 41 may be adjusted to generate a positive-going pulse $e$ at a predetermined time $t_1$ after receiving the time-break pulse $d$ from the playback head 37. In response to the positive-going pulse $e$, bistable driver 64 is triggered ON to produce an output voltage which is amplified in power amplifier 66 for energizing the coil of a double-pole, double-throw relay 68. The energizing of the coil of relay 68 causes the relay contacts 70 and 72 to move to their uppermost positions. When the relay 68 is energized, lamp 20 is also energized by a circuit traceable from the −12-volt bias supply, the voltage dropping resistor 74, the closed relay contacts 72, the lamp 20, and to ground. Pilot lamps 76 and 78 are provided to indicate which of lamps 16 and 20 is energized and, thus, which group of signals is being combined to produce the traces on tape 29. Simultaneously with the energizing of lamp 20, lamp 16 is de-energized when the relay contact 72 breaks the circuit connecting the lamp 16 to the −12-volt bias supply.

When voltage is applied to the filament of lamp 20, there is a time lag of several hundred milliseconds before the lamp achieves full illumination. Therefore, the resistance of photoresistor 18 decreases slowly in proportion to the slowly increasing illumination by lamp 20. At the same time, when voltage is removed from lamp 16, the hot filament of lamp 16 glows for several milliseconds. Therefore, photoresistor 14 increases in resistance slowly. By taking advantage of this finite time for the lamps 16 and 20 to become de-energized and energized, the signals reproduced by playback heads 35 are blended out of connection with the recording heads 50 and the signals reproduced by playback heads 36 are blended into connection with recording heads 50 for recording as traces on tape 29.

Figure 3:
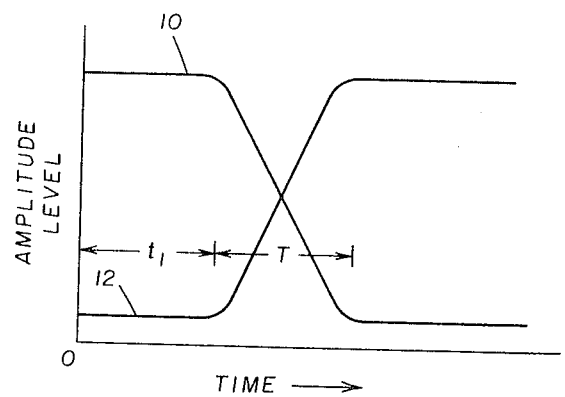
FIGURE 3 illustrates graphs depicting the change in amplitude level of the added input signals in the circuit of FIGURE 2.

The blending operation may be better seen by reference to FIGURE 3. There, it is illustrated, by curve 10, that the amplitude of all the signals reproduced by playback heads 35 are reduced continuously over a finite time T beginning at predetermined time $t_1$. The amplitude level of the signals reproduced by playback heads 36, as indicated by curve 12, is increased over the same period of time.

In order to provide the operator a visual indication of the composite signals being recorded on tape 29, a multichannel oscilloscope 80 is provided. The beam sweep of the oscilloscope 80 is triggered by the closing of a cam-operated switch 82 located on the periphery of recording drum 27. The position of cam 84 is such that when drum 27 is revolved, cam-operated switch 82 closes a circuit including conductor 86 to trigger the beam sweep of the oscilloscope 80 just prior to the beginning of reproduction of the traces recorded on tape 29.

After the drums 25–27 have made one complete revolution and an entire group of traces has been recorded on tape 29, it is necessary to return the lamps 16 and 20 to their former conditions of illumination. Therefore, at a fixed time $t_2$ after receiving the time-break pulse $d$, counter 41 sends out a negative-going pulse $f$ to trigger the bistable driver 64 OFF. Relay 68 is then de-energized and the relay contacts 70 and 72 return to their normally lower positions so that once again lamp 16 is energized and lamp 20 is de-energized.

In one embodiment of the system illustrated in FIGURE 2, some of the components of the system were as follows. Photoresistors 14 and 18 were Clairex CL–604L. The lamps 16 and 20 were Kay Pin Lite No. 30—30. A bistable multivibrator circuit suitable for use as the bistable driver 64 is one illustrated in the General Electric Company's Transistor Manual, Seventh Edition, Circuits, Applications, Characteristics, and Theory, at page 202. The resistor 21 had a value of 10K ohms.

Figure 4A:
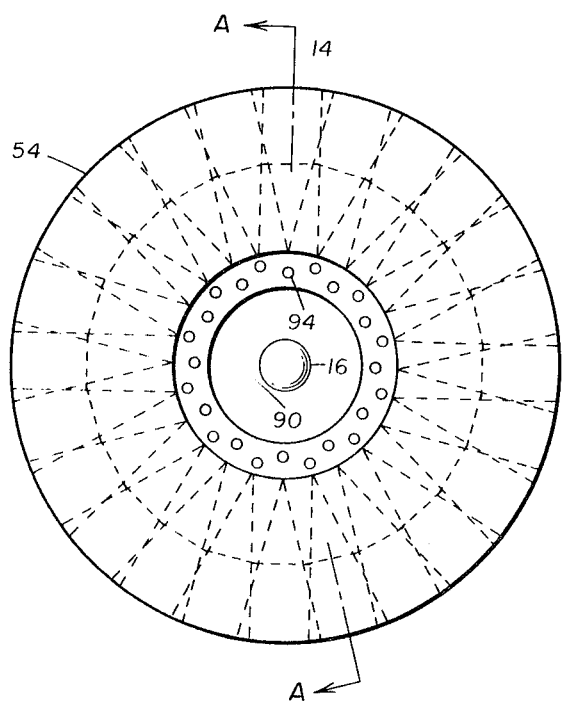
FIGURES 4A and 4B illustrate, respectively, a top view and a right-side, cross-sectional view taken along line A—A of FIGURE 4A of the housing containing the lamp and photoresistors in the system of FIGURE 2.
Figure 4B:
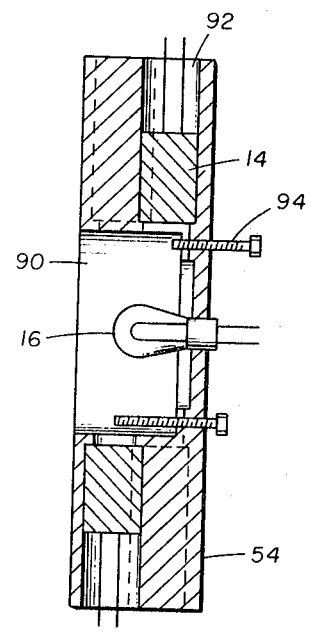

There will now be described with reference to FIGURES 4A and 4B the construction of a housing suitable for use as the light-tight housings 54 and 58 (FIGURE 1). FIGURE 4A is a top view of the housing, and FIGURE 4B is a right-side, cross-sectional view of the housing taken along line A—A in FIGURE 4A. The disk-shaped housing 54 has a central cavity 90 and twenty-four radially disposed passageways extending outwardly from the cavity to the periphery of the disk 54. Twelve of the radially disposed passageways lie in one plane and the remaining twelve passageways lie in another parallel plane. One photoresistor associated with each trace is located in each passageway. For example, the photoresistor 14 may be located in passageway 92. The lamp 16 is located at the center of cavity 90 so that light is incident on all twenty-four of the photoresistors.

To calibrate the change of resistance of the photoresistors in the housing 54, a screw is provided in front of each passageway to intercept a portion of the light from lamp 90. Screw 94 is provided for photoresistor 14.

Now that the invention has been described in detail, it will become apparent to those skilled in the art that certain modifications may be made. In FIGURE 2, there may certainly be other photosensitive elements used other than the photoresistors illustrated. Any element may be substituted which changes impedance in response to the amount of radiation incident thereon. Also, there may be other means for impinging radiations on the photosensitive elements other than the lamps illustrated. The radiation does not necessarily have to be within the visible spectrum. Ultraviolet lamps work equally as well coupled with a matching photosensitive element. It will be readily apparent that there may be other means for controlling the intensity of the photosensitive element in addition to the relay means shown for controlling the input energy thereto. Furthermore, the photosensitive elements may be connected in circuit arrangements between the input circuits and the output circuits other than in series. In addition, there may be more than one photosensitive element in each input circuit.

It will also be readily apparent that there may be other means for generating a control function to selectively connect one input signal or the other to the output circuit. A human operator may, by throw of a switch or other means, generate a control function to activate or deactivate selectively the means for impinging radiation on the photosensitive elements. In still another embodiment, there may be other means for reproducing the input signals to the gating circuit than the magnetic reproducers of tape drums 17 and 18.

It is intended to cover all those modifications of the invention as fall within the scope of the appended claims.

What is claimed is:
1. The method of electronically splicing portions of seismic traces, comprising the steps of:
 (a) reproducing a first group of traces and a second group of traces with a common time reference,
 (b) adjusting the amplitude of said first group to a level desirable for recording,
 (c) adjusting the amplitude of said second group to a level substantially below said level desirable for recording,
 (d) simultaneously adding individual traces of said first group and the corresponding individual traces of said second group to form a first composite group of traces,
 (e) recording said first composite group,
 (f) at a predetermined time following said common time reference, reducing the amplitude of said first group continuously over a finite period of time to a level substantially below said level desirable for recording while simultaneously increasing the amplitude of said second group continuously over the same period of time to said level desirable for recording,
 (g) simultaneously adding individual traces of said first group and the corresponding individual traces of said second group to form a second composite group of traces, and
 (h) recording said second composite group.

2. A system for electronically splicing the early portion of a first group of seismic signals containing information indicative of an earth characteristic onto the later portion of a second group of seismic signals containing information indicative of the same earth characteristic to produce a third group of signals containing the best information from both of said first-mentioned groups, said system comprising:
 (a) a first and second means for reproducing said first and second groups of seismic signals with a common time reference,
 (b) means for recording said third group of signals,
 (c) means for reducing the amplitude of said second group to a level substantially below the amplitude of said first group,
 (d) means for adding individual signals of said first group and corresponding individual signals of said second group to produce said third group,
 (e) means for generating a control function at a predetermined time following said common time reference, and
 (f) means responsive to said control function for reducing continuously over a finite period of time the amplitude of said first group while simultaneously increasing continuously over the same period of time the amplitude of said second group.

3. A system as defined in claim 2 including also a means for visually monitoring said third group of seismic signals during recording.

4. A system for electronically splicing the early portion of a first input seismic signal containing information indicative of an earth characteristic onto the later portion of a second input seismic signal containing information indicative of the same earth characteristic to produce an output signal containing the best information from both input signals, said system comprising:
 (a) means for cyclically reproducing said first and second input signals with a common time reference,
 (b) means for recording said output signal in synchronism with the reproduction of said input signals,
 (c) a first and second input channel for connection respectively to said reproduced first and second input signals,
 (d) an output channel for connection to said first and second input channels and for applying said output signal to said recording means,
 (e) a first element whose impedance varies in proportion to the amount of radiation impinging thereon connected in circuit with said first input channel,
 (f) a second element whose impednace varies in proportion to the amount of radiation impinging thereon connected in circuit with said second input channel,
 (g) means for exposing radiant energy to said first and second elements,
 (h) means for generating a first control function at a predetermined time following said common time reference during reproduction of said input signals and a second control function at the end of each reproduction cycle, and (i) means for controlling the amount of radiant energy exposed to said first and second elements and responsive to said first control function to close said first input channel and open said second input channel and responsive to said second control function to reopen said first input channel and reclose said second input channel.

5. A system as in claim 4 wherein said first and second elements are photoresistors and said means for exposing radiation is a light source.

6. A system as in claim 4 wherein said means for exposing radiation comprises a pair of radiation sources and wherein said means for controlling radiant energy causes one of said sources to be deactivated while simultaneously the other of said sources is activated.

7. The system as in claim 6 wherein said means for controlling radiant energy comprises a mechanical relay for controlling the input energy to said first and second radiation sources.

References Cited

UNITED STATES PATENTS

| | | | |
|---|---|---|---|
| 3,129,296 | 4/1964 | Claras et al. | 179—100.2 |
| 3,150,327 | 9/1964 | Taylor | 340—15.5 X |
| 3,172,077 | 3/1965 | Hawkins et al. | 340—15.5 |
| 3,188,575 | 6/1965 | Sheffet | 340—15.5 X |
| 3,197,574 | 7/1965 | Zane | 179—100.2 X |
| 3,202,926 | 8/1965 | Ford et al. | |
| 3,218,396 | 11/1965 | Mullin | 179—100.2 X |
| 3,218,620 | 11/1965 | Clunis. | |
| 3,219,971 | 11/1965 | Cole | 340—15.5 |
| 3,314,046 | 4/1967 | Brown | 340—15.5 |

BENJAMIN A. BORCHELT, *Primary Examiner.*

R. M. SKOLNIK, *Assistant Examiner.*